(12) United States Patent
Igarashi

(10) Patent No.: US 7,720,057 B2
(45) Date of Patent: May 18, 2010

(54) PACKET RELAY APPARATUS AND CONTROL METHOD FOR DATA RELAY APPARATUS

(75) Inventor: Kai Igarashi, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 948 days.

(21) Appl. No.: 11/091,493

(22) Filed: Mar. 29, 2005

(65) Prior Publication Data

US 2005/0220099 A1 Oct. 6, 2005

(30) Foreign Application Priority Data

Mar. 30, 2004 (JP) .............................. 2004-100614

(51) Int. Cl.
  *H04L 12/56* (2006.01)
(52) U.S. Cl. ..................................................... 370/389
(58) Field of Classification Search ................ 370/389, 370/395.3, 395.31, 395.54
  See application file for complete search history.

(56) References Cited

U.S. PATENT DOCUMENTS 7,275,113 B1 * 9/2007 Araujo ....................... 709/245
7,360,086 B1 * 4/2008 Tsuchiya et al. ............. 713/168
7,421,266 B1 * 9/2008 Bruestle et al. .............. 455/411

FOREIGN PATENT DOCUMENTS

JP          10-13443          1/1998

* cited by examiner

*Primary Examiner*—Ricky Ngo
*Assistant Examiner*—Chandrahas Patel
(74) *Attorney, Agent, or Firm*—Fitzpatrick, Cella, Harper & Scinto

(57) ABSTRACT

A data relay apparatus is connected to a network having a DHCP server and an authentication server. The data relay apparatus stores a MAC address of a communication device permitted to connect to it. When a communication device attempts to connect to the data relay apparatus, it is determined whether a MAC address of the communication device is stored in the data relay apparatus. If the MAC address is stored, the communication device is not authenticated by the authentication server, instead, dummy data indicating that authentication is successful is transmitted to the communication device. If the communication device requests that the DHCP server assign it an IP address, the DHCP server assigns an IP address to the communication device. Different security levels are set for a communication device that has failed to authenticate to the authentication server and for a communication device that successfully authenticates to the authentication server.

5 Claims, 5 Drawing Sheets

PACKET RELAY APPARATUS AND CONTROL METHOD FOR DATA RELAY APPARATUS

FIELD OF THE INVENTION

The present invention relates to a packet relay apparatus and a control method for a data relay apparatus.

BACKGROUND OF THE INVENTION

As a means for connecting information devices to one another, a wired or wireless LAN (Local Area Network) has become widespread and has been widely used in homes and offices.

In such a network, TCP/IP protocol is generally used. Data communication is realized by exchanging data packets complying with this protocol. A terminal device connected to a network is assigned an address called an IP address for identifying the terminal device on the network. A data packet contains the IP addresses of a transmission source and destination. That is, in a network designed to perform communication by using TCP/IP, IP addresses must be set for the respective terminal devices which communicate with one another.

As a method of setting IP addresses for terminal devices, there is available a method of automatically assigning a proper IP address to a terminal device newly connected to a network by using a protocol called DHCP (Dynamic Host Configuration Protocol), in addition to a method of setting fixed IP addresses for terminal devices in advance.

When DHCP is to be used, IP addresses are managed by a DHCP server on a LAN. Upon receiving a request to assign an IP address from a terminal device newly connected to the network, the DHCP server selects an unused IP address from a plurality of stored IP addresses and transmits it to the terminal device. The use of DHCP makes it possible to assign IP addresses to only terminal devices connected to the network without assigning any IP addresses to terminal devices which are not connected to the network. Therefore, an IP address resource can be efficiently used as compared with the case wherein fixed IP addresses are assigned to the respective terminal devices.

When a portable terminal device such as a notebook PC is to be used, the use of DHCP makes it unnecessary to perform complicated operation to change the IP address of a terminal device every time it connects to a different network. This makes it possible for the user to use various networks regardless of the place where the terminal device is used.

In the above network, however, an unauthorized user who is not permitted to connect to the network can use the network by connecting his/her terminal device to the network without permission. This allows unauthorized access to a server, or the like, on the LAN. In order to solve this problem, it is preferable to authenticate the user of a terminal device when the terminal device is connected to the network.

In general, such a system often uses a method of preparing, on the LAN, an authentication server storing authentication information comprising user IDs, password information, and the like, and performing authentication by causing a terminal, which tries to connect to the network, to transmit authentication information to the authentication server. Introducing such an authentication means makes it possible to solve the above problem associated with security on the network.

Assume that a given wireless terminal device whose authentication information is not registered in the authentication server need not access to a server or the like on the LAN but wants to communicate with another wireless terminal device through a packet relay apparatus such as a wireless access point or router by using TCP/IP. In this case, no packet is relayed to the DHCP server because of an authentication failure, and hence any IP address from the DHCP server cannot be assigned to the terminal device. As a consequence, TCP/IP-based communication cannot be performed.

This problem can be avoided by fixing an IP address to the terminal device in advance. This, however, makes operation complicated. In addition, the setting information of a network to which connection is to be made must be known in advance, resulting in an increased work load on the user.

SUMMARY OF THE INVENTION

It is an object of the present invention to allow the user of a communication device to perform communication without performing complicated operation when connecting to a network.

It is another object of the present invention to assign an address to a communication device which is permitted to connect to a relay apparatus even if the communication device fails authentication by a server on a network.

It is still another object of the present invention to change the security level in a communication device which is assigned an address.

Other features and advantages of the present invention will be apparent from the following description taken in conjunction with the accompanying drawings, in which, like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

An embodiment of the present invention will be described below with reference to the accompanying drawings.

Figure 1:
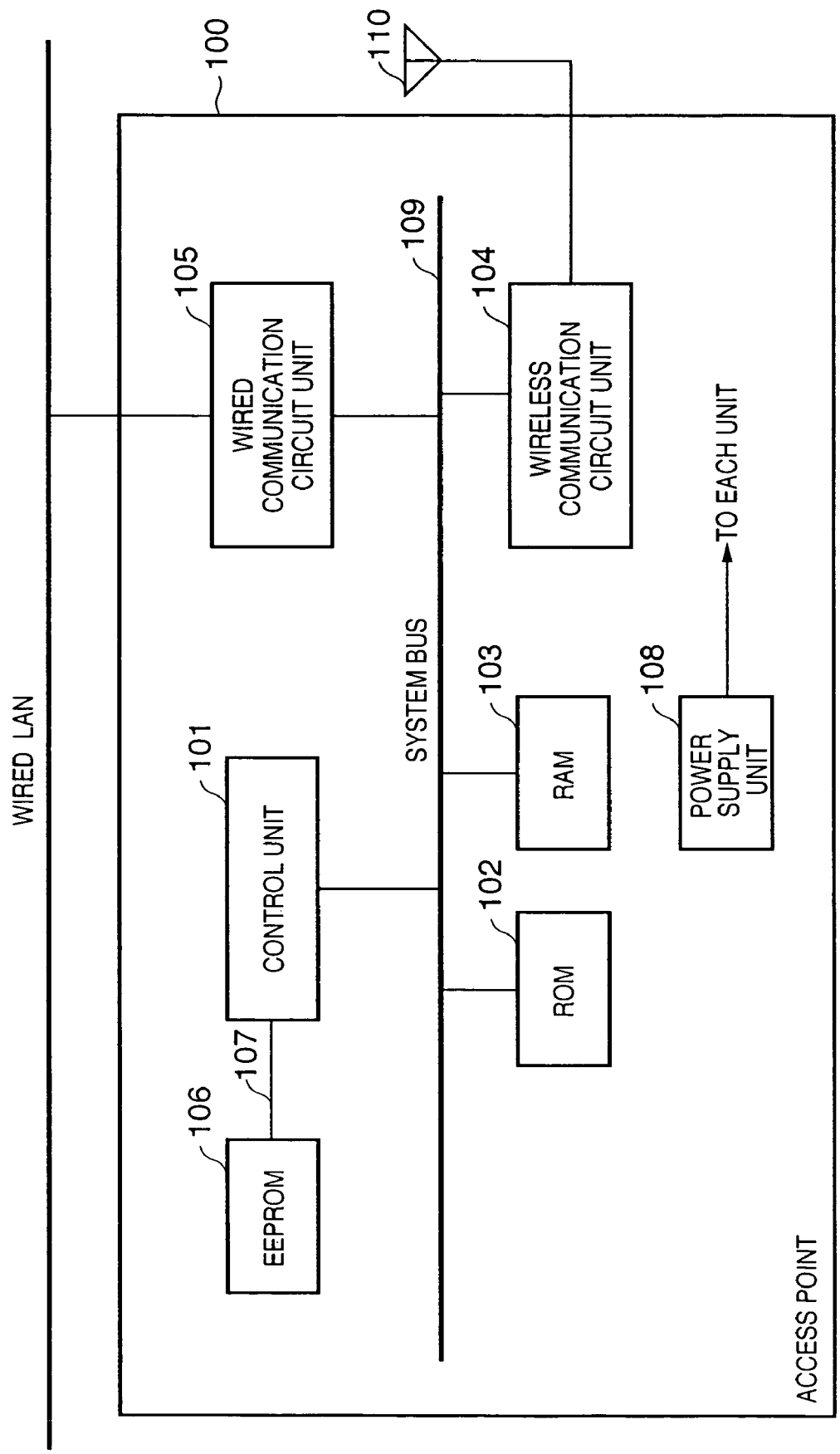
FIG. 1 is a block diagram showing the internal arrangement of a packet relay apparatus (access point) according to an embodiment of the present invention.

FIG. 1 is a block diagram showing the internal arrangement of a packet relay apparatus according to the embodiment of the present invention. In this embodiment, the packet relay apparatus is an access point 100 having a wireless communication function which is installed on a LAN (Local Area Network).

Referring to FIG. 1, the access point 100 comprises a control unit 101, ROM 102, RAM 103, wireless communication circuit unit 104, wired communication circuit unit 105, EEPROM 106, serial interface 107, power supply unit 108, and system bus 109. The respective blocks except for the EEPROM 106 and power supply unit 108 are connected to each other through the system bus 109. The EEPROM 106 is directly connected to the control unit 101 through the serial interface 107. The power supply unit 108 supplies power necessary for each block described above to operate.

The access point 100 is connected to a wireless terminal device (to be simply referred to as a "wireless terminal" hereinafter) having a wireless communication function (not shown) through an antenna 110. The access point 100 is also connected to devices such as a server and network printer (not shown) which exist on a wired LAN.

The control unit 101 comprises a microprocessor, its peripheral circuits, and the like, and performs overall control of the access point 100. In addition, the control unit 101 performs access control and the like for the respective blocks shown in FIG. 1.

The control unit 101 executes the operation control program stored in the ROM 102 to perform relay processing for packets transmitted/received between a wireless terminal and a device such as a server existing on the wired LAN. The control unit 101 also performs control to permit/inhibit the transfer of a packet between the wireless terminal and the device existing on the wired LAN or the like or determine whether or not to permit a wireless terminal which tries to connect, on the basis of filtering settings for each wireless terminal which are stored in the RAM 103. In this case, the settings for filtering include various kinds of data such as the IP address and MAC address of a transmission source (wireless terminal), a destination IP address (the IP address of a server on a trunk LAN), transmission source port number, and destination port number. By using these data, the control unit 101 determines whether or not the transfer of a packet to each wireless terminal is permitted or connection to the access point 100 itself is permitted.

The filtering settings include a portion which can be updated as needed during operation of the access point 100 in accordance with a change in the wireless terminal connected to the access point due to connection to a new wireless terminal or disconnection of the wireless terminal, and a portion, such as the IP address of a server (not shown) on the trunk LAN or a destination port number on the server side, which is fixed unless it is explicitly changed by the user. The information of the fixed portion is stored in the EEPROM 106. This information is read out from the EEPROM 106 and stored in the RAM 103 when the access point is powered on.

The control unit 101 also realizes a function as a DHCP relay agent by executing the program stored in the ROM 102. The DHCP relay agent function is a function of relaying a DHCP request transmitted as a broadcast packet from a wireless terminal upon converting it into a unicast packet addressed to the DHCP server 203 (to be described later) upon receiving the DHCP request. A merit of this function is to make it unnecessary for devices other than the DHCP server on the LAN to receive an unnecessary broadcast packet.

The ROM 102 is a nonvolatile memory which stores the operation control program executed by the control unit 101, and outputs stored contents onto the system bus 109 in accordance with an instruction from the control unit 101.

The RAM 103 functions as a work memory when the operation control program is executed by the control unit 101, and also functions as a buffer memory for temporarily storing various kinds of data to be transmitted/received to/from a wireless terminal or a device on the wired LAN. In addition, the RAM 103 has an area for storing data for the above filtering settings.

The wireless communication circuit unit 104 transmits/receives packets to/from a wireless terminal through the antenna 110, and forms, by itself, one wireless network interface. Preparing a plurality of wireless communication circuit units 104, therefore, makes it possible for the access point 100 to have a plurality of wireless network interfaces. The wireless communication circuit unit 104 comprises a radio-frequency circuit, coding and decoding circuits, and the like (not shown), and realizes wireless communication with a wireless terminal having the same kind of wireless communication means.

The wired communication circuit unit 105 is designed to transmit/receive signals to/from the wired LAN, and comprises a transmission/reception circuit which actually transmits/receives packets to/from a device existing on the wired LAN, coding and decoding circuits (not shown), and the like. The wired communication circuit unit 105 forms, by itself, one wired network interface. As in the case of the wireless network interface, preparing a plurality of wired communication circuit units 105 makes it possible for the wired communication circuit unit to have a plurality of wired network interfaces.

In this embodiment, unique MAC addresses are assigned to all devices on the wired LAN and wireless LAN. When data are transmitted/received between adjacent devices existing in the same network by setting transmission source and destination MAC addresses at predetermined positions in each data frame, devices which are to perform data transmission/reception are directly specified by using MAC addresses. When data is to be communicated between terminal devices on different networks, IP addresses assigned to the devices are used.

The EEPROM 106 is an electrically erasable and programmable nonvolatile memory, and stores various kinds of setting information for defining the operation of the access point 100. The EEPROM 106 is connected to the control unit 101 through the serial interface 107. Information is read out from or written in the EEPROM 106 under the control of the control unit 101. In addition, of information necessary for the execution of filtering processing by the control unit 101 described above, a fixed portion including the IP address information of a server existing on the wired LAN, a destination port number, and the like, and the IP address information of the access point on the network and the like are stored in the EEPROM 106.

Figure 2:
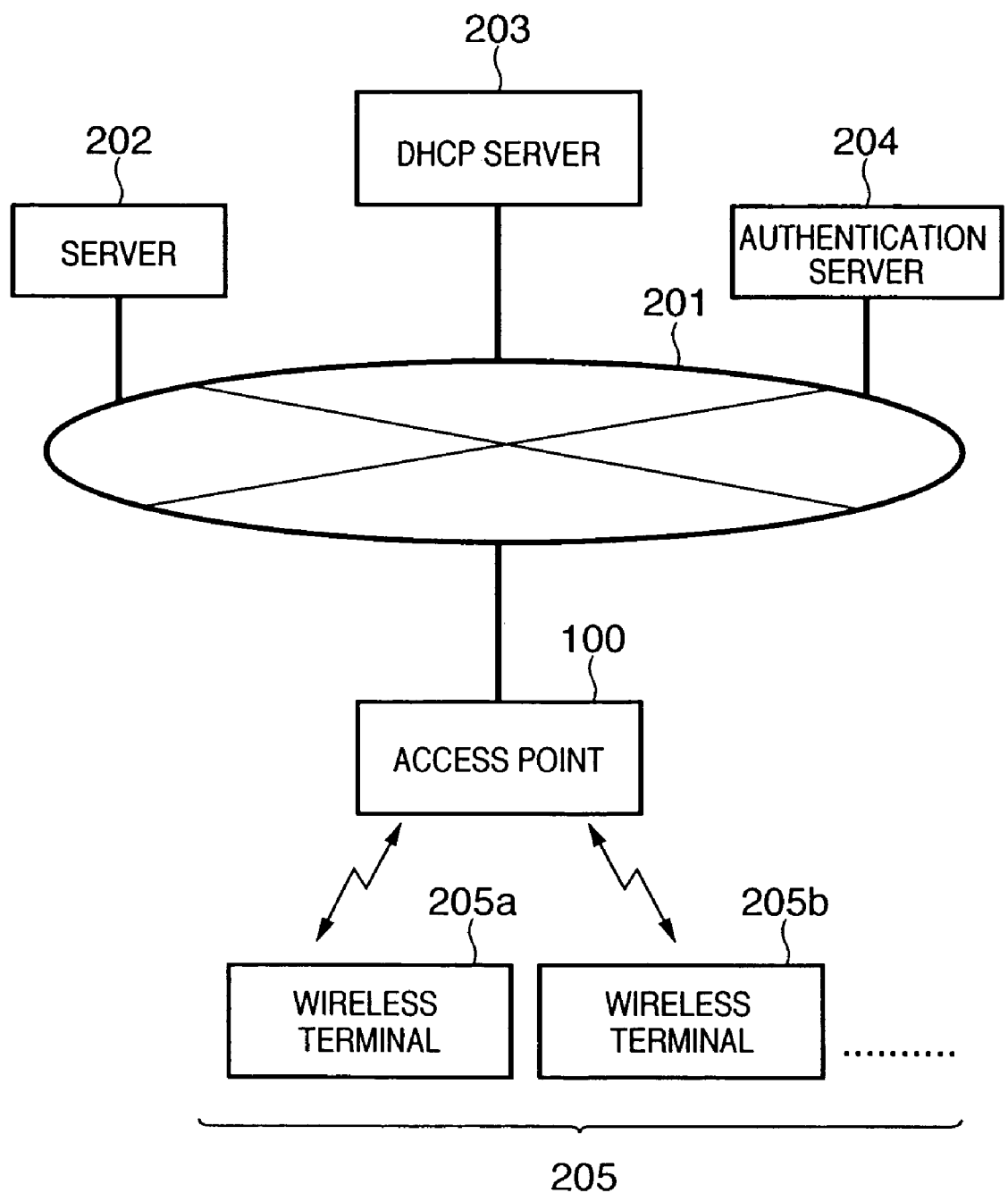
FIG. 2 is a view showing the overall arrangement of a network according to the embodiment of the present invention.

FIG. 2 is a view showing the overall arrangement of a network including the access point 100 in FIG. 1.

Referring to FIG. 2, this network comprises the access point 100 existing on a LAN 201, a server 202 including a Web server, mail server, printer server, and the like, a DHCP server 203, an authentication server 204, and a wireless terminal 205. The wireless terminal 205 may include a plurality of wireless terminals 205a, 205b .... The number of wireless terminals is not limited to that shown in FIG. 2.

The access point 100 and the wireless terminals 205a and 205b are connected to each other wirelessly. The wireless terminals 205a and 205b are configured to issue IP address assignment requests to the DHCP server 203 through the access point 100 and be assigned IP addresses.

The basic operation of the access point 100 in the network shown in FIG. 2 will be described next with reference to FIG. 3.

Figure 3:
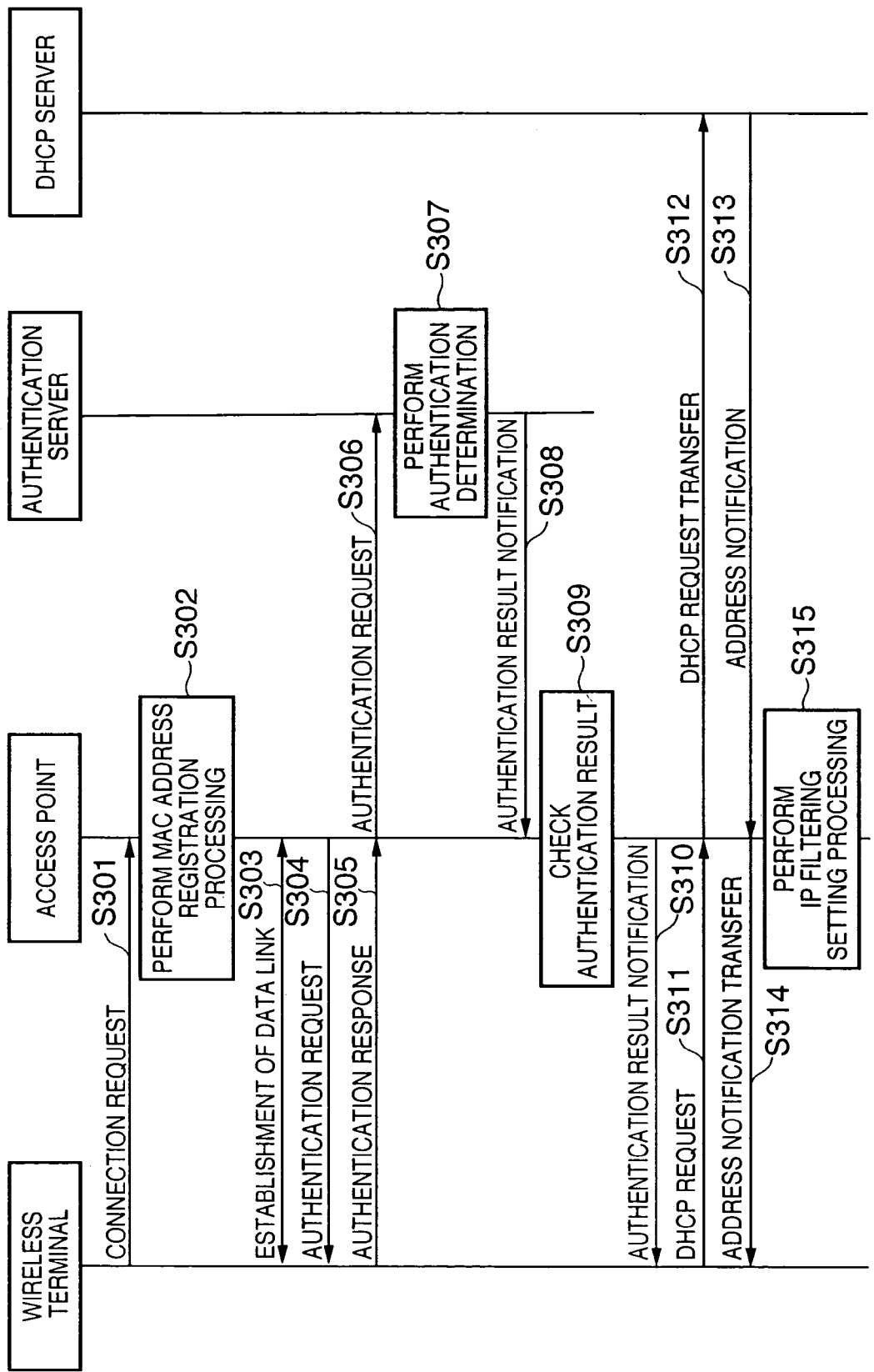
FIG. 3 is a sequence chart showing processing contents to be performed when the access point according to the embodiment of the present invention receives a network connection request packet from a wireless terminal.

FIG. 3 is a sequence chart showing processing contents executed when the access point 100 in FIG. 1 receives a network connection request packet from a wireless terminal. More specifically, the access point 100 receives a network connection request packet (to be simply referred to as a "connection request" hereinafter) from the wireless terminal 205, and the authentication server 204 authenticates the wireless terminal 205. FIG. 3 shows a sequence in which after the authentication, the DHCP server 203 assigns an IP address to the wireless terminal 205 by using DHCP, and settings for IP filtering are made in the access point 100.

Referring to FIG. 3, first of all, upon receiving a connection request from the wireless terminal 205 (step S301), the access point 100 stores the MAC address of the wireless terminal 205 set by the connection request in a predetermined area in the RAM 103. In addition, MAC address registration processing is executed with respect to the stored MAC address of the wireless terminal 205 to set a communication permission flag representing the permission or inhibition of communication through the access point 100 (step S302).

In this case, a communication permission flag is set by a user having a proper right of management with respect to the access point 100. More specifically, the access point 100 is configured to be capable of referring to a list of MAC addresses of wireless terminals which are connected to or try to connect to the access point 100 through another external terminal or device. When the above user accesses the access point from another external terminal through the wired or wireless LAN or accesses the access point 100 from a terminal such as a personal computer by using an external serial communication means (not shown) of the access point 100, a communication permission flag is set, and the set communication permission flag is stored in the RAM 103 in correspondence with a MAC address. The communication permission flag is initially set to "inhibition" unless it is changed by the user, thereby inhibiting another terminal device from communicating with a server through the access point 100.

As a communication protocol for communication from another external terminal or the like to the access point, a protocol such as SNMP (Simple Network Management Protocol), HTTP (Hyper Text Transfer Protocol), or telnet can be used.

The access point 100 reads a MAC address from a packet transmitted from a wireless terminal. In addition, the access point 100 can refer to a communication permission flag corresponding to the MAC address data stored in the RAM 103 and operate to reject connection requests other than one from a wireless terminal which is permitted to communicate through the access point 100.

The access point 100 then establishes a communication (data) link with the wireless terminal 205 for which a communication permission flag is set to "permission", and shifts to a state wherein it can perform data communication with the wireless terminal 205 (step S303). When a communication link with the wireless terminal 205 is established, the access point 100 transmits an authentication request to the wireless terminal 205 (step S304) to activate authentication processing.

Upon receiving an authentication response returned from the wireless terminal 205 in response to the authentication request (step S305), the access point 100 transfers this as an authentication request to the authentication server 204 existing on the LAN 201 (step S306). In this case, authentication data (authentication information) contained in the authentication request from the wireless terminal 205 comprises, for example, a user ID and hashed password data necessary for authentication.

The authentication server 204 reads authentication data contained in the authentication request transferred from the access point 100, and compares the read data with authentication data registered in advance, thereby determining whether or not to authenticate the user of the wireless terminal 205 (step S307). The authentication server 204 then transmits the authentication result to the access point 100 (step S308). After receiving the authentication result notified from the authentication server 204, the access point 100 executes the processing of checking the authentication result (step S309).

Figure 4:
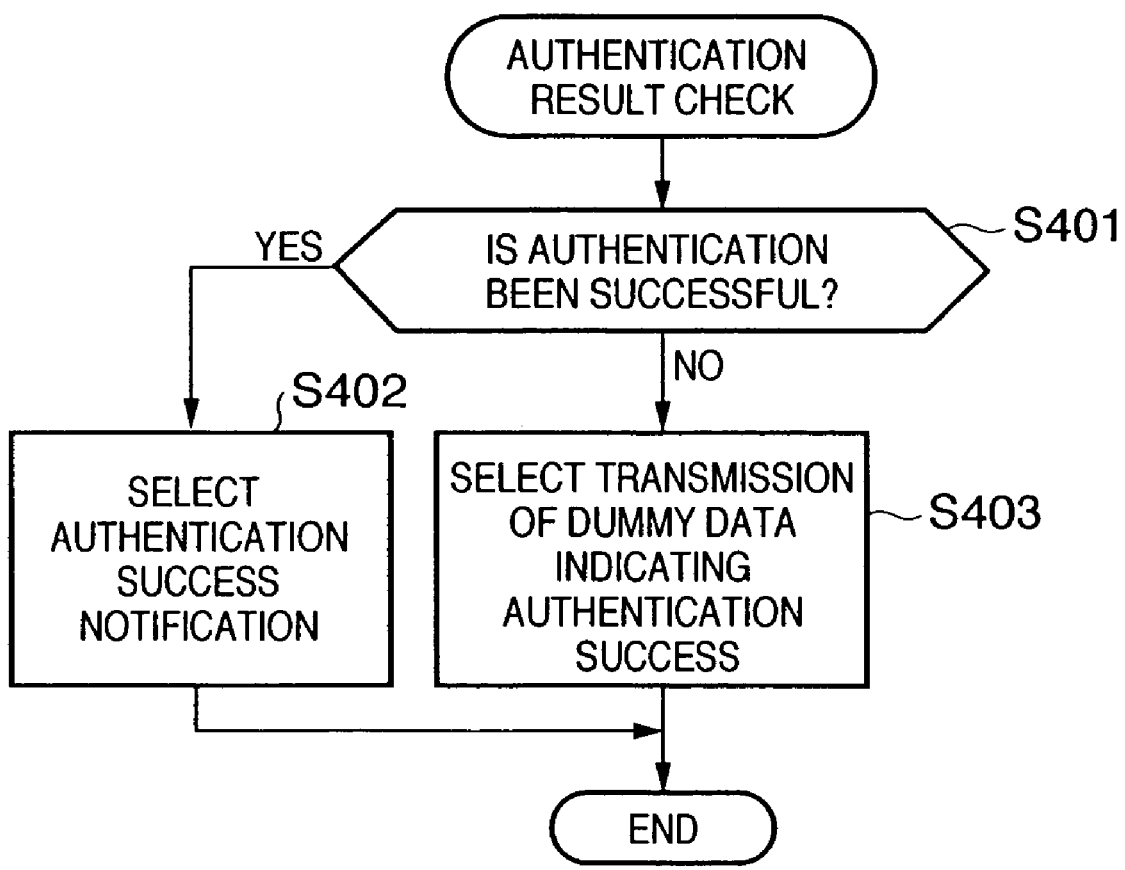
FIG. 4 is a flowchart showing the contents of authentication result check processing to be executed by the access point according to the embodiment of the present invention.

FIG. 4 is a flowchart showing the contents of authentication result check processing executed by the access point 100 in step S309 in FIG. 3.

Referring to FIG. 4, upon receiving the authentication result obtained by the authentication server 204 with respect to the wireless terminal 205 from the authentication server 204, the access point 100 determines on the basis of the received authentication result whether or not authentication is successful (step S401). If the wireless terminal 205 has been properly registered for authentication in a database (not shown) of authentication data to which the authentication server 204 refers, and authentication of the wireless terminal 205 by the authentication server 204 is successful (YES in step S401), the access point 100 selects authentication success notification for the wireless terminal 205 (step S402). This processing is then terminated.

If authentication has failed because the wireless terminal 205 has not been registered for authentication in the above authentication database or unauthorized authentication data has been transmitted upon inputting of a wrong password (NO in step S401), the access point 100 selects dummy data transmission for authentication success (with respect to the wireless terminal for which authentication is rejected by the authentication server 204 on the LAN 201 and a communication permission flag for the access point 100 is set to "permission") (step S403). This processing is then terminated.

Referring back to FIG. 3, after the processing shown in FIG. 4 (the processing in step S309 in FIG. 3) is terminated, the access point 100 notifies the wireless terminal 205 of the authentication result based on the result of the processing in step S309 (step S310). If dummy data transmission for authentication success has been selected in step S403 in FIG. 4, dummy data for authentication success is transmitted.

Upon receiving the notification of actual authentication success or the dummy data for authentication success from the access point 100, the wireless terminal 205 can determine that connection to the network is permitted, and hence subsequently requests the DHCP server 203 on the LAN 201 to assign an IP address. That is, after receiving the notification of authentication success or the dummy data for authentication success, the wireless terminal 205 broadcasts a DHCP request packet for the assignment of an IP address to the network (step S311).

Upon receiving the broadcast packet for the DHCP request transmitted from the wireless terminal 205, the access point 100 converts the packet received by the DHCP relay agent function into a unicast packet, and transfers it to the DHCP server 203 on the DHCP server 203 (step S312).

Upon receiving the DHCP request packet transferred by the access point 100, the DHCP server 203 selects one of a plurality of IP addresses which can be assigned to the wireless terminal 205 and transmits it to the access point 100 (step S313). Note that the DHCP server 203 assigns IP addresses such that the addresses partly coincide with each other on a subnet basis. That is, IP addresses are assigned to allow determination whether or not a given terminal is a terminal to be connected to the LAN 201 or a terminal to be connected to the LAN 201 and to the access point 100 by checking the IP address.

Upon receiving a packet for address notification transmitted from the DHCP server 203, the access point 100 reads the IP address assigned to the wireless terminal 205 and contained in the received packet, stores it in the RAM 103, and transfers the packet to the MAC address of the wireless terminal 205 which has issued the DHCP request (step S314). The processing associated with the DHCP request is then terminated.

After the IP address is assigned to the wireless terminal 205 by DHCP, the access point 100 performs settings for IP filtering (designating an IP address for the permission of relaying of the packet) by using the IP address assigned to the wireless terminal 205 (step S315). Subsequently, packet processing is performed in accordance with the filtering settings.

Access right settings indicating a specific range of servers and other terminals on the LAN 201 which the wireless terminal 205 authenticated by the authentication server 204 is permitted to access are preferably stored on the authentication server 204 side in correspondence with the above authentication information. In this case, the access point sets filtering setting information for the wireless terminal which has been successfully authenticated, upon receiving a notification from the authentication server 204.

Figure 5:
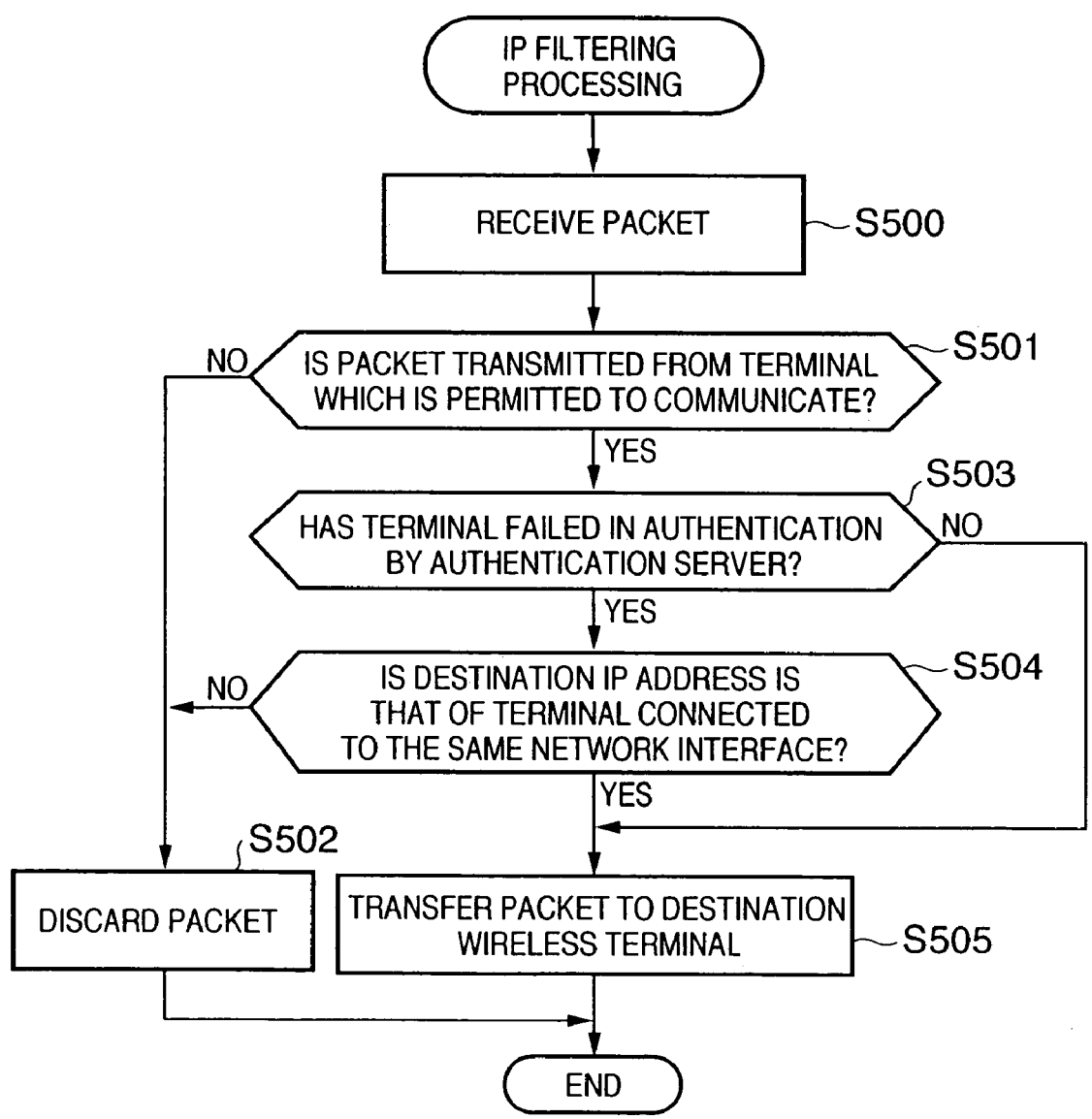
FIG. 5 is a flowchart showing the contents of IP filtering processing to be executed by the access point according to the embodiment of the present invention.

FIG. 5 is a flowchart showing the contents of IP filtering processing executed by the access point 100.

The access point 100 permits a wireless terminal authenticated by the authentication server 204 on the LAN 201 to make normal access to the LAN 201. With regard to a wireless terminal which is not authenticated by the authentication server 204 but is permitted to perform communication through the access point 100 because a communication permission flag for the access point 100 is set to "permission", the access point 100 operates to permit this wireless terminal to communicate with only other wireless terminals connected to the same network interface (in this case, the wireless communication circuit unit 104 serving as the wireless network interface of the access point 100).

Referring to FIG. 5, the access point 100 receives a packet from the wireless terminal (step S500), and determines whether the received packet is a packet from a wireless terminal which is permitted to connect, on the basis of the transmission source MAC address contained in the received packet and the communication permission flag of the corresponding MAC address stored in the RAM 103 (step S501). If it is determined that the received packet is a packet from a wireless terminal which is not permitted to communicate (NO in step S501), the flow advances to step S502 to discard the received packet. If it is determined that the received packet is a packet from a wireless terminal which is permitted to communicate (YES in step S501), the flow advances to step S503.

In step S503, the access point 100 reads the MAC address or IP address of the wireless terminal as the packet transmission source from the received packet, and determines whether or not the wireless terminal is a wireless terminal which has failed in authentication by the authentication server 204. If this wireless terminal is a wireless terminal which is successful in authentication by the authentication server 204 (NO in step S503), the packet is transferred to the destination terminal (step S505).

If this wireless terminal is a wireless terminal which has failed in authentication by the authentication server 204 (YES in step S503), it is determined whether or not the destination of the packet is a terminal connected to the same network interface as that of the transmission source. That is, the IP address of the wireless terminal as the packet transmission source is compared with that of the destination to determine whether or not they have the same network address. If it is determined that the destination of the packet is connected to the same network interface as that of the transmission source (YES in step S504), the flow advances to step S505. Note that whether the destination of the packet is a terminal connected to the same network interface as that of the transmission source may be determined by determining whether or not the IP address of the destination contains information designating a subnetwork formed by the access point 100.

If the destination of the packet is a terminal connected to a network interface different from that of the transmission source (a server on the LAN 201 or the like) (NO in step S504), the flow advances to step S502 to discard the received packet. In this case, when the destination of a packet is a terminal connected to the same wireless interface as that of the transmission source, relaying of the packet is permitted. However, a condition for permitting relaying of a packet may be that the transmission source and the destination belong to a subnetwork higher in order than the access point 100.

In step S505, the access point 100 transfers the packet to the wireless terminal designated as the destination. This processing then terminated.

In the above embodiment, the wireless terminal 205 is not permitted to access the LAN 201. However, when a manager who has a proper right of management with respect to the network makes a permission, for example, the wireless terminal 205 can be permitted to access only a specific server on the LAN 201 by changing the above IP filtering settings so as to change the conditions for the transfer and discarding of a packet.

According to the above embodiment, in the network in which IP addresses are assigned by the DHCP server 203, an IP address is assigned to even the wireless terminal 205 which is not authenticated by the authentication server 204 at the start of connection to the access point (packet relay apparatus) 100 as long as the wireless terminal is permitted to connect to the packet relay apparatus. In addition, since filtering settings are made for an IP address assigned by this method, the user need not perform any complicated operation, and can perform TCP/IP-based communication within the range of the filtering settings.

As described above, according to the present invention, even a wireless terminal which has failed authentication by the authentication server can be assigned an IP address by the DHCP server. In addition, the user of a wireless terminal can perform TCP/IP-based communication with a terminal device without performing any complicated operation when connecting to the network.

Furthermore, the range in which a packet from a terminal device which has failed in authentication by the authentication server is relayed can be limited more than that for a terminal device which is successful in authentication. This makes it possible to ensure security while permitting even a terminal device which has failed in authentication by the authentication server to communicate.

The present invention is not limited to the above embodiment described above and can be variously changed within the spirit and scope of the invention. For example, the above embodiment has exemplified the access point 100 which has one each of a network interface for a wired LAN and a network interface for a wireless LAN. However, the number of network interfaces is not limited to the above. The present invention can be applied to a case wherein an access point has only a plurality of wired network interfaces or only a plurality of wireless network interfaces.

In addition, the above embodiment, an access point has been described as a packet relay apparatus. However, the present invention can be applied to devices other than an access point, e.g., a network device such as a router.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-100614 filed on Mar. 30, 2004, which is hereby incorporated by reference herein.

What is claimed is:

1. A data relay apparatus that is connected to a wired network and connects a wireless communication apparatus to the wired network, the apparatus comprising:
   a connection device that connects to an authentication server that performs an authentication in accordance with a network connection request from the wireless communication apparatus and to an address assignment server that assigns a logical address to the wireless communication apparatus via the wired network;
   a storage device that stores a physical address of the wireless communication apparatus;
   a first determination device that determines, based on the physical address stored in the storage device and a physical address of the wireless communication apparatus that requests a connection with the data relay apparatus, whether to permit the wireless communication apparatus to connect;
   a second determination device that determines, based on an authentication result notification received from the authentication server, whether the authentication by the authentication server for the wireless communication apparatus has been successful;
   a processing device that causes the address assignment server to assign the logical address to the wireless communication apparatus, if the first determination device determines that the wireless communication apparatus is permitted to connect, even if the second determination device determines that the authentication by the authentication server for the wireless communication apparatus has failed,
   a receiving device that receives a packet transmitted from the wireless communication apparatus, the packet including a destination address of a destination communication apparatus;
   a third determination device that determines, based on the received packet, whether the destination address corresponds to a network address of a sub network formed by the data relay apparatus; and
   a relay device that:
      does not relay the packet transmitted from the wireless communication apparatus, if the first determination device determines that the wireless communication apparatus is not permitted to connect,
      relays the packet transmitted from the wireless communication apparatus to the destination communication apparatus, if the first determination device determines that the wireless communication apparatus is permitted to connect and if the second determination device determines that the authentication by the authentication server for the wireless communication apparatus has been successful,
      relays the packet transmitted from the wireless communication apparatus to the destination communication apparatus, if the first determination device determines that the wireless communication apparatus is permitted to connect, if the second determination device determines that the authentication by the authentication server for the wireless communication apparatus has failed, and, if the third determination device determines that the destination address of the destination communication apparatus corresponds to the network address of the sub network formed by the data relay apparatus, and
      does not relay the packet transmitted from the wireless communication apparatus to the destination communication apparatus, if the first determination device determines that the wireless communication apparatus is permitted to connect, if the second determination device determines that the authentication by the authentication server for the wireless communication apparatus has failed, and, if the third determination device determines that the destination address of the destination communication apparatus does not correspond to the network address of the sub network formed by the data relay apparatus.

2. The apparatus according to claim 1, wherein the processing device causes the address assignment server to assign the logical address to the wireless communication apparatus, if the first determination device determines to permit the wireless communication apparatus to connect, and does not cause the address assignment server to assign the logical address to the wireless communication apparatus, if the first determination device determines not to permit the wireless communication apparatus to connect.

3. The apparatus according to claim 1, wherein the processing device notifies the wireless communication apparatus of the logical address assigned by the address assignment server.

4. The apparatus according to claim 1, wherein the processing device transmits information indicating that the authentication by the authentication server for the wireless communication apparatus has been successful, if the first determination device has determined to permit the wireless communication apparatus to connect, even if the second determination device determines that the authentication by the authentication server for the wireless communication apparatus has failed.

5. A control method performed by a data relay apparatus for connecting a wireless communication apparatus to a wired network, which connects to an authentication server that performs an authentication in accordance with a network connection request from the wireless communication apparatus and to an address assignment server that assigns a logical address to the wireless communication apparatus via the wired network, the method comprising:
   a connection step of connecting to the authentication server that performs authentication in accordance with the network connection request from the wireless communication apparatus and to the address assignment server that assigns the logical address to the wireless communication apparatus via the wired network;
   a storage step of storing a physical address of the wireless communication apparatus in a storage device;
   a first determination step of determining, based on the physical address stored in said storage step and a physical address of the wireless communication apparatus that requests a connection with the data relay apparatus, whether to permit the wireless communication apparatus to connect;

a second determination step of determining, based on an authentication result notification received from the authentication server, whether the authentication by the authentication server for the wireless communication apparatus has been successful;

an assignment step of causing the address assignment server to assign the logical address to the wireless communication apparatus, if a determination is made in the first determination step that the wireless communication apparatus is permitted to connect, even if a determination is made in the second determination step that the authentication by the authentication server for the wireless communication apparatus has failed, a reception step of receiving a packet transmitted from the wireless communication apparatus, the packet including a destination address of a destination communication apparatus;

a third determination step of determining, based on the packet received in the reception step, whether the destination address corresponds to a network address of a sub network formed by the data relay apparatus; and a relay step of:
  not relaying the packet transmitted from the wireless communication apparatus, if a determination is made in the first determination step that the wireless communication apparatus is not permitted to connect;
  relaying the packet transmitted from the wireless communication apparatus to the destination communication apparatus, if the determination is made in the first determination step that the wireless communication apparatus is permitted to connect and if a determination is made in the second determination step that the authentication by the authentication server for the wireless communication apparatus has been successful; and
  relaying the packet transmitted from the wireless communication apparatus to the destination communication apparatus, if the determination is made in the first determination step that the wireless communication apparatus is permitted to connect and if the determination is made in the second determination step that the authentication by the authentication server for the wireless communication apparatus has failed and if a determination is made in the third determination step that the destination address of the destination communication apparatus corresponds to the network address of the sub network formed by the data relay apparatus, and
not relaying the packet transmitted from the wireless communication apparatus, if the determination is made in the first determination step that the wireless communication apparatus is permitted to connect, if the determination is made in the second determination step that the authentication by the authentication server for the wireless communication apparatus has failed, and if a determination is made in the third determination step that the destination address of the destination communication apparatus does not correspond to the network address of the sub network formed by the data relay apparatus.

* * * * *